(12) United States Patent
Lau et al.

(10) Patent No.: US 6,470,512 B1
(45) Date of Patent: Oct. 29, 2002

(54) OPTIMIZED SHOWER ARRANGEMENT FOR HIGH VOLUME USE

(75) Inventors: Michael Lau, Dollern; Sven Schaich, Neu Wulmstorf, both of (DE)

(73) Assignee: Airbus Deutschland GmbH, Hamburg (DE)

( * ) Notice: Subject to any disclaimer, the term of this patent is extended or adjusted under 35 U.S.C. 154(b) by 25 days.

(21) Appl. No.: 09/723,612

(22) Filed: Nov. 27, 2000

(30) Foreign Application Priority Data

Nov. 25, 1999 (DE) .......................................... 199 56 668

(51) Int. Cl.$^7$ ................................................. A47K 3/28
(52) U.S. Cl. ................................. 4/612; 4/900; 52/79.8
(58) Field of Search ........................... 4/596, 912, 900; 52/79.8

(56) References Cited

U.S. PATENT DOCUMENTS

| | | | | |
|---|---|---|---|---|
| 2,247,340 A | * | 6/1941 | Webster | ..................... 4/900 X |
| 4,348,777 A | * | 9/1982 | Peterson | ..................... 4/900 X |
| 4,796,311 A | * | 1/1989 | Shankman | ..................... 4/596 |
| 5,551,102 A | * | 9/1996 | Stewart et al. | ................. 4/612 |

* cited by examiner

Primary Examiner—Charles E. Phillips

(57) ABSTRACT

A shower arrangement for a passenger aircraft includes a single shower cabin and at least two dressing cabins associated with the shower cabin. A door arrangement selectively opens and closes access areas passing from the dressing cabins into the shower cabin, so that only one access area can be open at any given time, while the other access area(s) is (are) closed. The throughput rate of the shower is increased, because at any given time a first user can be dressing in a first dressing cabin after having showered, while a second user is showering in the shower cabin, and while a third user is undressing in a third dressing cabin in preparation for taking a shower. Privacy is maintained by the interlocked doors.

20 Claims, 5 Drawing Sheets

OPTIMIZED SHOWER ARRANGEMENT FOR HIGH VOLUME USE

PRIORITY CLAIM

This application is based on and claims the priority under 35 U.S.C. §119 of German Patent Application 199 56 668.2, filed on Nov. 25, 1999, the entire disclosure of which is incorporated herein by reference.

FIELD OF THE INVENTION

The invention relates to a shower arrangement, especially for high volume use in a passenger cabin of a transportation vehicle, essentially including a shower cabin with a showering device therein and an access area leading to the shower cabin.

BACKGROUND INFORMATION

Conventional shower arrangements, especially for use in public facilities or public transportation vehicles, must provide the needed privacy for the persons who will be using such shower arrangements. For this reason, each shower cabin or shower stall of such an arrangement typically has an individual access area allocated thereto, whereby a respective single person who will use the respective shower will alone enter and use the allocated access area, which typically includes a closable and lockable dressing or changing cabin. The process of showering in such an arrangement thus involves the following sequential steps:

1) entering the dressing or changing cabin;
2) undressing;
3) preparing to shower;
4) entering the shower cabin and showering therein using the showering device such as a shower spray head or a handheld shower nozzle;
5) drying after the shower;
6) dressing in the dressing cabin;
7) applying make-up or carrying out other cosmetic, hair-styling, or hygiene steps in the dressing cabin; and
8) leaving the dressing or changing cabin.

During all of the above steps of the showering process, the entire shower arrangement, including the shower cabin as well as the access area comprising a changing or dressing cabin, is occupied by and dedicated to the use of a single user. Additional users who wish to take a shower must thus wait until the shower arrangement becomes available. Thereby, the frequency of use or the throughput or duty cycle of the shower arrangement is limited by the total time necessary to carry out all of the above mentioned steps. As a result, an increased number of such shower arrangements must be installed to provide the opportunity for a corresponding number of persons to take a shower as desired. This, of course, leads to higher costs, higher installation efforts, and also increased weight and space demands, which is particularly critical in transportation vehicles such as commercial aircraft.

Especially in high capacity commercial passenger aircraft that are outfitted for long-haul flights, it is a constant goal or even a necessity to provide the best possible comfort and service for the passengers. Therefore, it is also a goal to provide for the passengers the opportunity to take a shower as desired. It is problematic, though, in the passenger cabin of an aircraft, that the space which can be dedicated to the necessary number of shower arrangements is strictly limited. Under such conditions, the highest possible throughput or duty cycle and thus utilization frequency of each individual shower arrangement must be achieved.

SUMMARY OF THE INVENTION

In view of the above, it is an object of the invention to provide a shower arrangement of the above described general type, which is suitable for use in public facilities or in the passenger cabins of public transportation vehicles, whereby the installation cost and effort as well as the required space can be minimized, while increasing the duty cycle and utilization frequency of the shower in comparison to the prior art. The invention further aims to avoid or overcome the disadvantages of the prior art, and to achieve additional advantages, as apparent from the present specification.

The above objects have been achieved according to the invention in a shower arrangement including a shower cabin equipped with a showering device such as a shower spray head or a handheld shower sprayer, as well as at least two access areas that separately provide access to the single shower cabin. Particularly, the access areas are so embodied that access to the shower cabin is only possible through a single one of the access areas at any given time, while access through the other one or ones of the access areas is blocked. The selective opening and closing of respective ones of the access areas to the shower cabin is controlled by a suitable door arrangement.

According to further details of the invention, each access area comprises an access cabin and an access passage such as a doorway connecting the respective access cabin to the shower cabin. The access cabin and access passage may, for example, comprise a changing or dressing cabin and an access doorway in which the door arrangement selectively allows or blocks access between the respective dressing cabin and the shower cabin.

With such an arrangement, at least two dressing cabins are associated with each shower cabin, so that the throughput and duty cycle of the shower cabin can be increased. In the same context, the utilization of the minimum or limited available floor space is optimized because less space will be vacant at any time.

Particularly, several users can independently prepare themselves for taking a shower in the respective individual dressing cabins (i.e. carrying out the above described steps 1 to 3), or can be carrying out the necessary post-shower activities (i.e. above described steps 5 to 8) in the respective individual dressing cabins, while one user is taking a shower in the shower cabin, simultaneously without interfering with one another. It is evident that the throughput or duty cycle of the shower cabin is no longer limited by the total time required to carry out all of the above pre-shower, shower, and post-shower steps 1 to 8. Instead, the post-shower steps 5 to 8 can be carried out by a first user in a first dressing cabin while simultaneously a second user in a second dressing cabin is carrying out the pre-shower steps 1 to 3, and/or is taking a shower (step 4) in the shower cabin. In an arrangement with two dressing cabins, the throughput of the shower cabin itself is limited only by the time it takes to carry out the showering step 4 plus the longer of the times necessary for carrying out the steps 1 to 3 or the steps 5 to 8, but time is gained by the overlapping performance of the steps 1 to 3 and 5 to 8 by successive users in the separate dressing cabins.

Thus, according to the invention, a greater number of users can use the shower in a given period of time, in comparison to a conventional shower arrangement that includes a single dressing cabin allocated to a single shower cabin. Thereby, the cost and additional space required for installing additional shower arrangements can be avoided or minimized, while simultaneously the passenger comfort and convenience can be improved, since waiting times can be reduced.

BRIEF DESCRIPTION OF THE DRAWINGS

In order that the invention may be clearly understood, it will now be described in connection with example embodiments, with reference to the accompanying drawings, wherein:

FIG. 2A schematically shows a top view of a variation of the embodiment of FIG. 2, using a single partial-cylindrical access door;

DETAILED DESCRIPTION OF PREFERRED EXAMPLE EMBODIMENTS AND OF THE BEST MODE OF THE INVENTION

Figure 1:
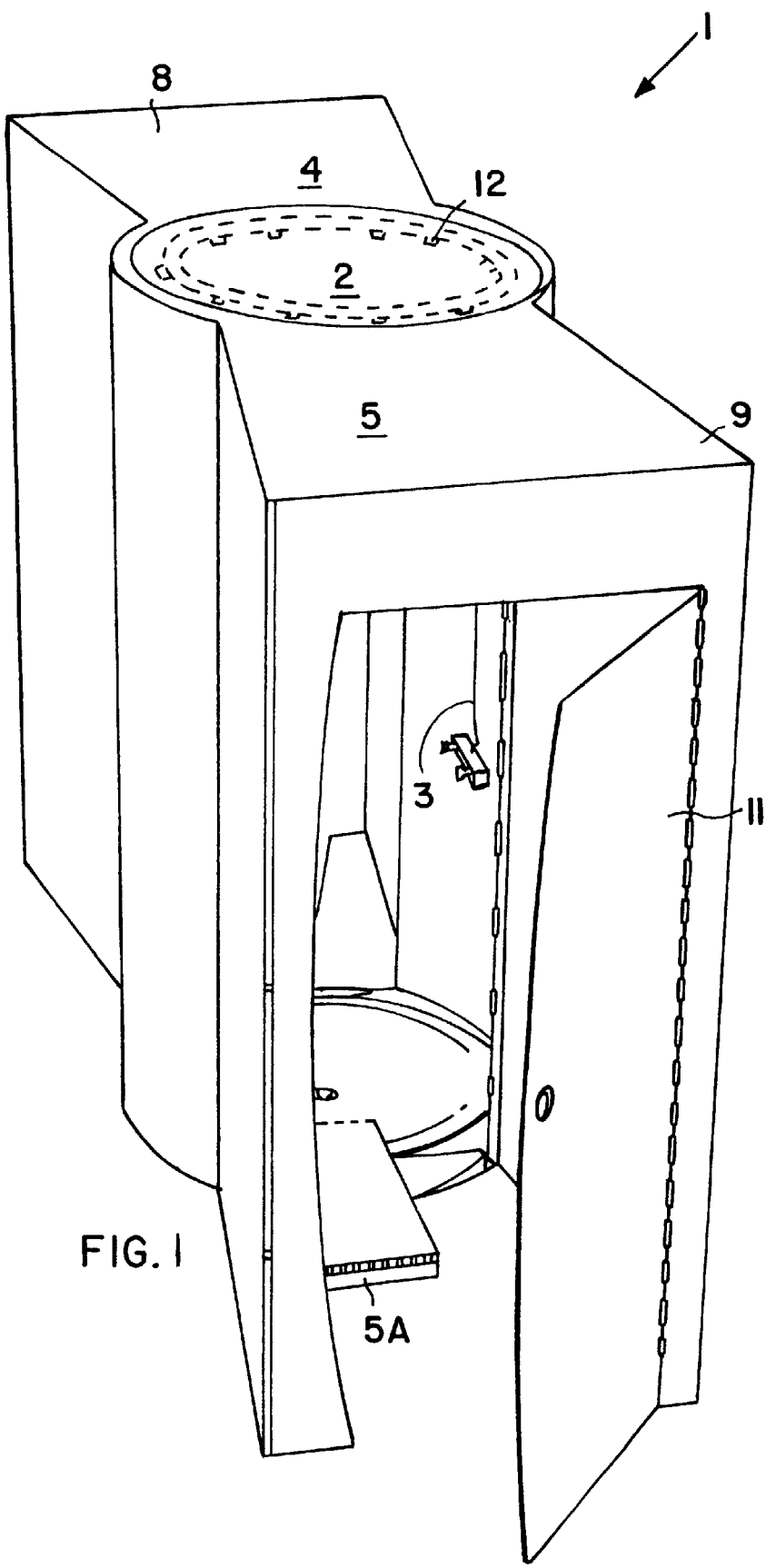
FIG. 1 is a schematic perspective view of a first embodiment of a shower arrangement according to the invention.
Figure 2:
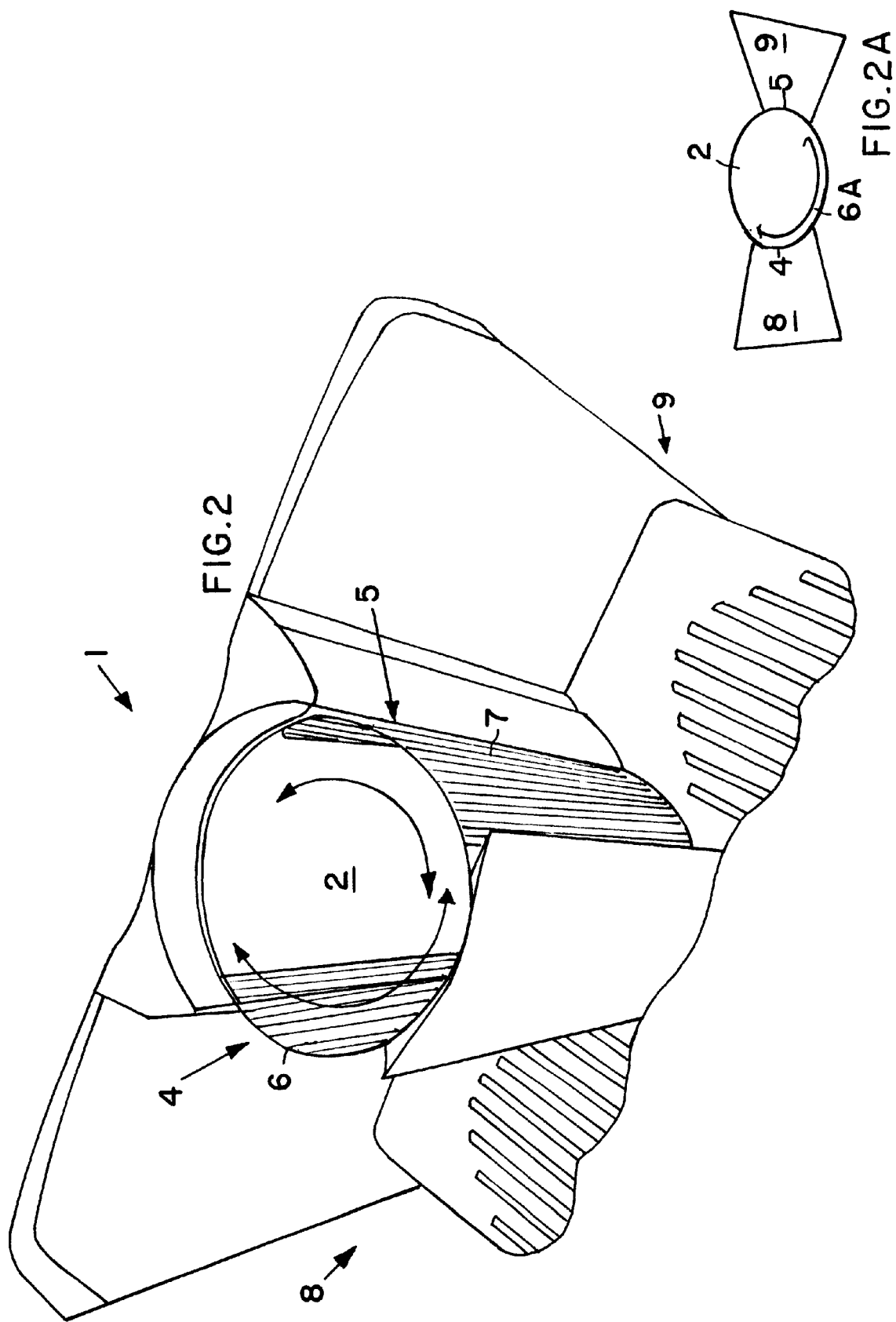
FIG. 2 is a schematic top perspective view of the shower arrangement according to FIG. 1.

FIGS. 1 and 2 show an inventive shower arrangement 1 comprising a centrally arranged shower cabin 2 and two separate access areas 4 and 5 arranged substantially on diametrically opposite sides of the shower cabin 2. Provided in the shower cabin 2 is a showering device 3, which includes the typical shower controls and nozzles, such as a shower spray head or a handheld shower sprayer, connected to a water supply. The showering device 3 is only partially and schematically illustrated, but can be any conventionally known showering equipment. The shower cabin 2 may further be equipped with a self-cleaning system 12, such as a ring of spray nozzles that spray a disinfecting or cleaning solution along the walls and floor of the shower cabin, and/or a high intensity ultraviolet light source or the like, in order to clean and disinfect the cabin 2 after each use thereof. The activation of the self-cleaning system 12 can be carried out manually as needed, or automatically after each use of the shower, for example by sensors or switches that activate the self-cleaning system when the shower cabin is unoccupied and the most-recently opened door of the cabin has been closed once again.

The shower cabin 2 in this embodiment has a circular floor area and is bounded by generally cylindrical shower walls, to which the two access areas 4 and 5 are connected on diametrically opposite sides. Each access area 4, 5 can be equipped or outfitted as an access cabin and particularly a changing or dressing cabin 8 or 9, for example including dressing room fixtures such as clothing hanger hooks, a seating bench, a countertop, a mirror, etc. In FIG. 1, simply a seating bench 9A is schematically illustrated.

Respective access passages or doorways lead from the two access areas 4 and 5 or dressing cabins 8 and 9 into the shower cabin 2. In order to selectively close or block the doorway access openings, a door arrangement includes doors 6 and 7 that are provided between the respective dressing cabins 8 and 9 and the shower cabin 2. The doors 6 and 7 are so arranged and embodied so that only one of the doors 6 or 7 can be opened at any given time, to provide access to the shower cabin 2 from only one of the access areas 4 or 5 at any given time, while the other access area 4 or 5 is closed or blocked from the shower cabin 2. This can be achieved manually by appropriate latches or the like, or by means of a control unit connected to sensors (e.g. floor pressure sensors, motion sensors, etc.) and actuated latches and the like. The exterior doorways of the dressing cabins 8 and 9 are respectively equipped with conventional doors 10 and 11 to provide the desired privacy in the dressing cabins 8 and 9.

As can be see especially in FIG. 2, the above described embodiment of FIG. 1 includes two access doors 6 and 7 to selectively provide access through the two access areas 4 and 5, i.e. from the dressing cabins 8 and 9. The two doors 6 and 7 are each cylindrically curved over a partial-cylindrical arc, to match the curvature of the plan form of the shower cabin 2. These doors 6 and 7 are preferably embodied as sliding doors that are slidable along the generally cylindrical wall of the shower cabin 2.

A further preferred embodiment is shown in FIG. 2A, wherein a single access door 6A is used instead of the two separate access doors 6 and 7. This single access door 6A extends over a portion of a cylinder, and spans a sufficient arc while leaving open a sufficient arc so that only one of the access areas 4 or 5 may be opened at a given time, while the other access area is blocked by the door 6A. In this manner, a simple partial rotation of the generally cylindrical segment door 6A about a vertical center axis coinciding with the center of the circular shower cabin 2 will positively allow only one of the access areas 4 or 5 to be opened at any given time while blocking the access from the other access area. For example, in the position illustrated in FIG. 2A, the access area 4 is closed while simultaneously the access area 5 is open.

Using a shower arrangement 1 according to the invention, the procedure for showering by a single user generally corresponds to the above described conventional procedure or sequence of steps, namely:

1) entering the dressing or changing cabin 8 or 9;
2) undressing;
3) preparing to shower;
4) entering and showering in the shower cabin 2, and then exiting the shower cabin 2;
5) drying;
6) dressing;
7) carrying out cosmetic, hairstyling, or hygiene steps; and
8) exiting from the dressing or changing cabin 8 or 9.

It should be understood that the steps 3 and 5 may alternatively be carried out entirely within one of the dressing cabins, or entirely within the shower cabin, or partially within the dressing cabin and partially within the shower cabin. The proper conduct of these sequential steps will depend on the most efficient time utilization of the respective spaces of the shower arrangement.

From the perspective of any given user, the overall process of preparing for a shower, showering, and then dressing after the shower is exactly the same as in a conventional arrangement, except that the waiting time has been reduced. Particularly, the privacy afforded to the user has not been impaired or reduced by the inventive arrangement, because access to the shower cabin and to the dressing cabin at all times during the use thereof is private and exclusive to the individual user, so that there is no interruption or disturbance by other users. Two users who use the arrangement including one shower cabin and two dressing cabins will each respectively have substantially the impression of using two independent private dressing cabins connected to two independent private shower cabins.

While the above sequence of steps appears to be the same as for a conventional shower arrangement when considered with regard to a single user, the inventive shower arrangement 1 provides an improved and more efficient space utilization and throughput or duty cycle of the shower in the following manner. Namely, while a first user is carrying out the steps 3, 4 and 5 in the shower cabin 2 and/or one of the dressing cabins 8 or 9, the second user can be carrying out the steps 1 and 2 (and possibly 3) in the other dressing cabin 9 or 8. Then, once the first user has finished using the shower cabin 2, this first user can carry out the steps 5 to 8 in the first dressing cabin, while the second user is already free to enter the shower cabin 2 and carry out the step 4 (and possibly also steps 3 and 5). This overlapping or parallel utilization of the shower arrangement and particularly the shower cabin can nearly double the throughput or duty cycle of the shower cabin itself, depending on the particular time taken by each user to carry out the associated steps in the respective dressing cabin.

Since the time used in the shower cabin 2 itself for actually taking a shower (step 4) is typically less than the time used for carrying out the other steps in the dressing cabin, a considerable increase in the utilization frequency or throughput rate and duty cycle of the shower is achieved by allocating more than one dressing cabin to a single shower cabin. Thus, in addition to the illustrated embodiment in which two dressing cabins are provided for one shower cabin, it is alternatively possible to provide three or more dressing cabins for a single shower cabin, whereby the particular arrangement is dependent on the size of the shower cabin and the dimensions and size relationships of the access areas relative to the shower cabin. An example in this context is given by the second embodiment of a shower arrangement shown in FIG. 3, which will be described next.

Figure 3:
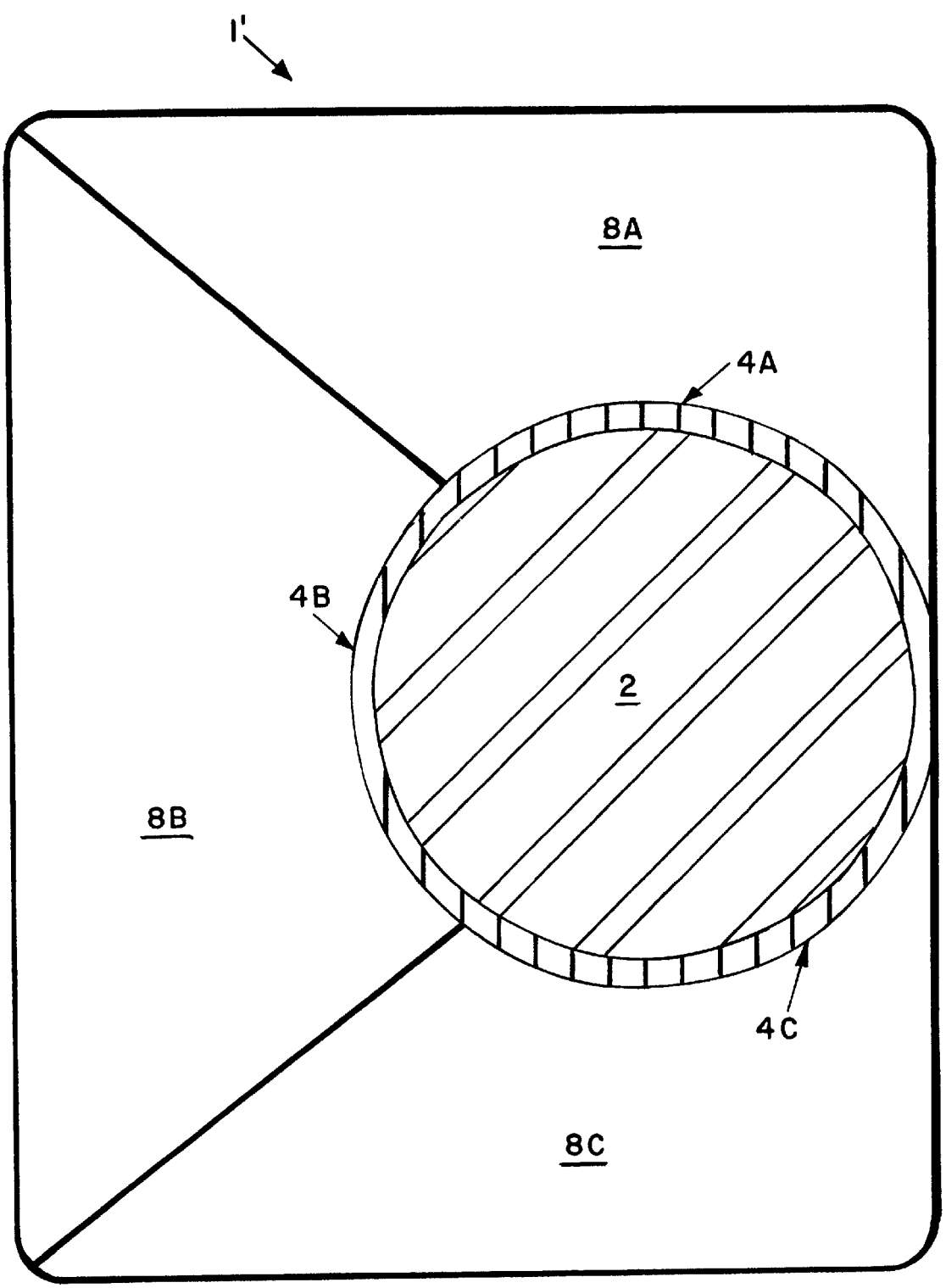
FIG. 3 is a schematic top view of a second embodiment of a shower arrangement according to the invention.

FIG. 3 shows a second embodiment of a shower arrangement 1' according to the invention, which includes three access areas 4A, 4B and 4C allocated to a single shower cabin 2, whereby three respective changing or dressing cabins 8A, 8B and 8C are provided at the three access areas 4A, 4B and 4C. The shower cabin 2 itself is substantially cylindrical, as in the above embodiment of FIGS. 1 and 2, and may be equipped with a single cylindrically curved door or several cylindrically curved doors as described above in connection with FIGS. 2 and 2A. In any event, the three access areas 4A, 4B and 4C as well as the associated dressing cabins 8A, 8B and 8C are distributed around the shower cabin 2, whereby the dressing cabin 8B is larger (i.e. has a larger floor surface area) than the dressing cabins 8A and 8C. In this manner, a larger dressing cabin can be provided as necessary or as desired, for example to accommodate handicapped individuals or a parent accompanying children or the like, or to provide a higher comfort level, for example for a first-class passenger in comparison to an economy class passenger.

With this FIG. 3 embodiment of a shower arrangement 1', the utilization frequency and throughput or duty cycle of the shower can be further increased in comparison to the first embodiment of FIGS. 1 and 2. Otherwise, the detailed description of the above first embodiment applies equally to the present second embodiment. In this second embodiment, the utilization of the shower can be optimized. For example, a first user can be carrying out the post-shower steps in the dressing cabin 8A, while a second user is actually taking a shower in the shower cabin 2 (having accessed it from the dressing cabin 8B), while simultaneously a third user is carrying out the pre-shower steps in the dressing cabin 8C.

It should also be appreciated that the embodiment of FIG. 3 very efficiently uses the available space in an aircraft or the like, because it includes the shower cabin and three dressing cabins while fully utilizing the floor space in a rectangular footprint, which can be efficiently accommodated within the floor plan of the aircraft. Such a rectangular footprint also allows the shower arrangement to be constructed as an independent module, which may be installed in any desired layout within the aircraft cabin, and combined with other standardized modules for additional shower arrangements, or other passenger comfort facilities (restrooms, galleys, etc.), as desired by the particular airline for which the aircraft is being outfitted.

Figure 4:
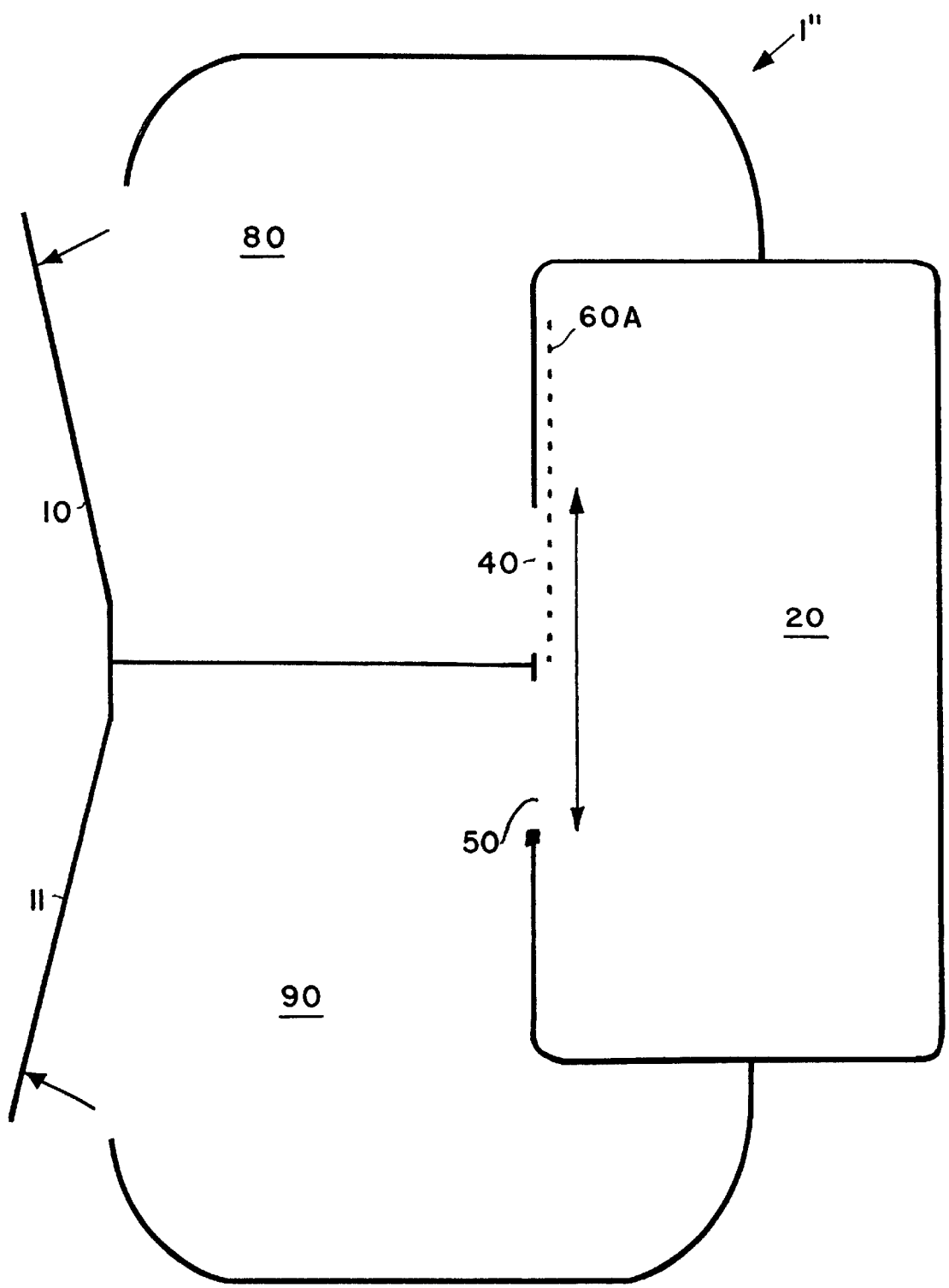
FIG. 4 is a schematic top view of a third embodiment of a shower arrangement according to the invention.

FIG. 4 schematically illustrates a third embodiment of a shower arrangement 1" in a top view. The arrangement includes a substantially rectangular shower cabin 20 as well as two access areas 40 and 50 allocated thereto. The access areas 40 and 50 are associated with respective dressing cabins 80 and 90, which ate each provided with a respective exterior door 10 and 11 to provide privacy within the respective dressing cabin. Such a shower cabin 20, having a rectangular form as illustrated, is a preferred embodiment of a polygon or a multi-sided shower cabin. However, other polygon floor surface shapes of shower cabins are alternatively possible, whereby a respective optimal adaptation of the shower arrangement to the available space can be achieved.

In the shower arrangement 1" shown in FIG. 4, the access areas 40 and 50 are respectively selectively closable by a single sliding door 60A. In this manner, at any given time, one of the access areas is closed while the other access area is open necessarily or automatically to allow passage from the associated dressing cabin into the shower cabin 20. For example, in the illustrated condition, the door 60A closes the access area 40, while leaving the access area 50 open to the shower cabin 20. With such an arrangement of the access door 6A, it is ensured that only one of the access areas will be open for accessing the shower cabin 2 at any given time.

Figure 5:
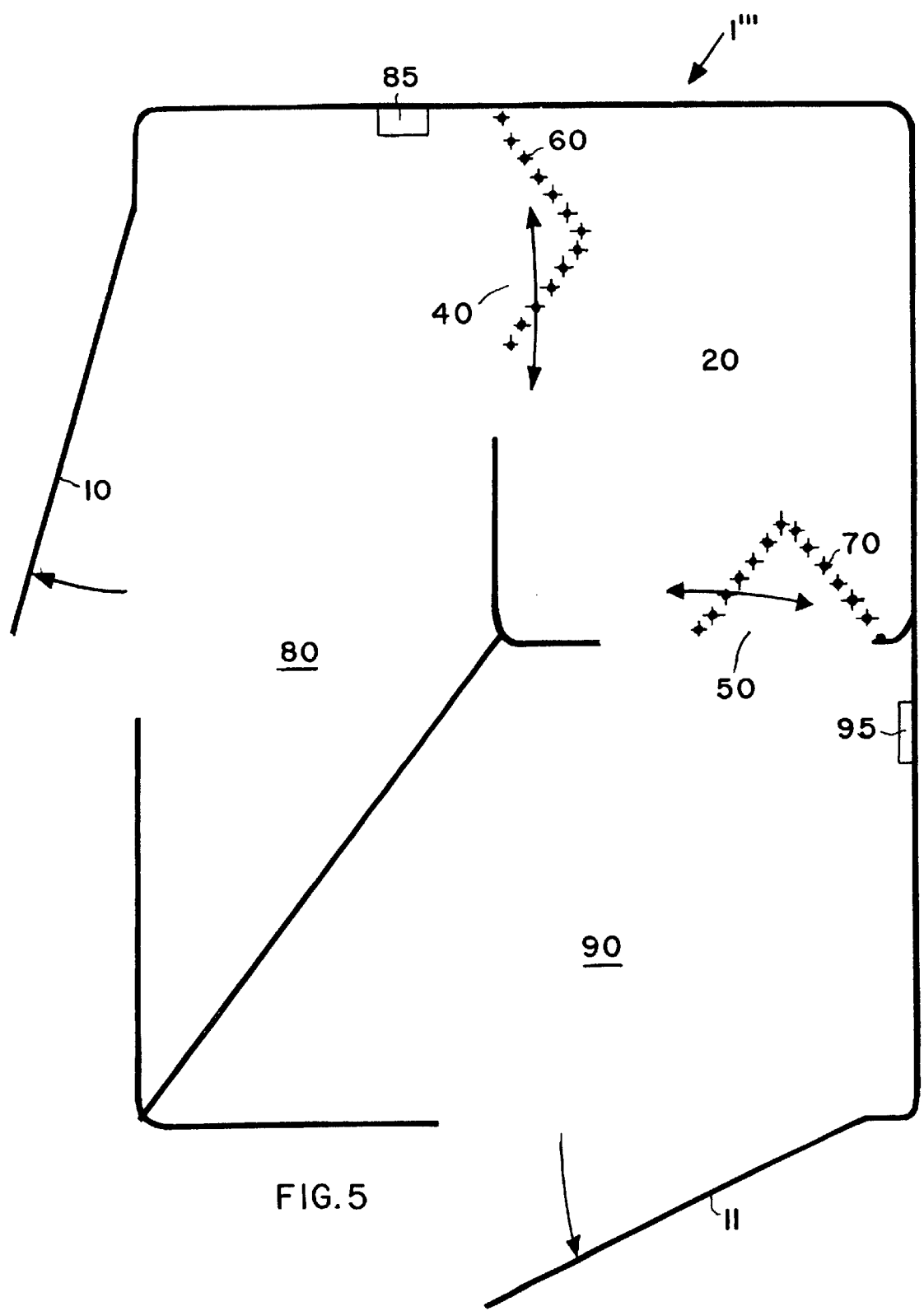
FIG. 5 is a schematic top view of a fourth embodiment of a shower arrangement according to the invention.

A further embodiment of a shower arrangement 1'" is shown in FIG. 5. This shower arrangement 1'" includes a rectangular shower cabin 20 and two access areas 40 and 50 associated with two dressing cabins 80 and 90 r respectively h having a generally trapezoidal floor plan shape, within an overall rectangular footprint the shower arrangement 1'". Two separate doors 60 and 70, such as bi-fold doors 60 and 70, respectively selectively close the two access areas 40 and 50 into the shower cabin 20. Such an arrangement of two doors 60 and 70 is advantageous when access to the shower cabin 20 cannot be provided entirely from one side, but instead from different sides or directions. With such an arrangement having two doors, it is generally recommended to provide a mechanical or electronic control system or blocking mechanism which always allows only one of the doors to be opened while the other door is latched or blocked in the closed condition. Additionally, it is preferred to provide indicator and control elements 85 and 95 respectively at each access area to inform the respective users in the dressing cabins 80 and 90 whether the shower cabin 20 is presently occupied, and possibly also the expected waiting time until the shower cabin 20 will again be vacant, and to control the opening and closing of the doors 60 and 70.

Various electronic and mechanical systems for ensuring that only one door or access opening can be opened at a given time, while another door or access opening is closed or blocked, are known to persons of ordinary skill in the art and have therefore not been described in detail herein. Any such mechanical or electronic interlock systems can be used in connection with the present inventive shower arrangement to ensure that only one of the access openings leading to a single shower cabin can be open at any one time.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A shower arrangement in which a person may shower-bathe, comprising:
    a shower cabin in which a person may shower-bathe, with a showering device adapted to spray a shower of water provided therein;
    first and second access cabins adjoining said shower cabin;
    first and second access passages respectively connecting said first and second access cabins with said shower cabin; and
    a door arrangement cooperating with said first and second access passages so as to selectively close said first access passage while allowing a person to pass through said second access passage and to selectively close said second access passage while allowing a person to pass through said first access passage.

2. The shower arrangement according to claim 1, wherein said first and second access cabins are respective first and second dressing cabins outfitted with dressing room fixtures.

3. The shower arrangement according to claim 2, further comprising first and second exterior doors connected respectively to said first and second dressing cabins and adapted to be respectively opened to allow a person to enter or exit a respective one of said dressing cabins and to be respectively closed to provide privacy in a respective one of said dressing cabins.

4. The shower arrangement according to claim 1, wherein said door arrangement comprises at least one access door that selectively opens and closes selected ones of said access passages.

5. The shower arrangement according to claim 4, wherein said shower cabin has a circular floor plan surface area, and said at least one access door has a cylindrical curvature matching a circumferential curvature of said circular floor plan surface area.

6. The shower arrangement according to claim 4, wherein said shower cabin has a polygonal floor plan surface area, and said at least one access door has a respective shape matching a shape of a respective one of said access passages.

7. The shower arrangement according to claim 4, wherein said at least one access door includes separate first and second access doors arranged to separately selectively close said first and second access passages respectively, and wherein said door arrangement further comprises a control system connected to said first and second access doors and adapted to allow only a selected one of said first and second access doors to be opened at any one time while locking another of said first and second access doors in a closed position.

8. The shower arrangement according to claim 4, wherein said at least one access door includes a total of exactly one unitary door that is arranged and adapted to selectively cover a selected one of said access passages while simultaneously uncovering another one of said access passages and vice versa.

9. The shower arrangement according to claim 8, wherein said one unitary door is rotatable about a vertical center axis, selectively to a first position in which said door uncovers said first access passage and covers said second access passage, and a second position in which said door uncovers said second access passage and covers said first access passage.

10. The shower arrangement according to claim 8, wherein said one unitary door is linearly slidable selectively to a first position in which said door uncovers said first access passage and covers said second access passage, and a second position in which said door uncovers said second access passage and covers said first access passage.

11. The shower arrangement according to claim 1, further comprising a respective indicator element arranged respectively in each one of said access cabins and adapted to indicate whether said shower cabin is occupied or vacant, and to indicate at least one of an occupancy duration time and an expected waiting time before a present occupancy of said shower cabin will end.

12. The shower arrangement according to claim 11, further comprising a respective control element arranged respectively in each one of said access cabins and adapted to control an operation of said door arrangement.

13. The shower arrangement according to claim 1, further comprising a self-cleaning system arranged in said shower cabin for self-cleaning said shower cabin.

14. The shower arrangement according to claim 13, further comprising an actuation system connected to said door arrangement and to said self-cleaning system, and adapted to actuate said self-cleaning system automatically upon closing of the most recently opened one of said access passages.

15. The shower arrangement according to claim 1, including a total of exactly two of said access cabins connected to and selectively communicating into said shower cabin.

16. The shower arrangement according to claim 1, further comprising a third access cabin connected to said shower cabin, and a third access passage selectively communicating said third access cabin into said shower cabin.

17. The shower arrangement according to claim 16, wherein said door arrangement comprises a single unitary access door that selectively uncovers any selected one of said access passages while covering both others of said access passages.

18. The shower arrangement according to claim 1, wherein one of said access cabins has a larger floor space than another of said access cabins.

19. The shower arrangement according to claim 1, wherein said shower cabin and said access cabins together form an overall rectangular or square floor plan footprint.

20. The shower arrangement according to claim 1, wherein said shower cabin has a circular floor plan footprint, and each one of said access cabins has an annular circular segment floor plan footprint extending radially from said circular floor plan footprint.

* * * * *

UNITED STATES PATENT AND TRADEMARK OFFICE
CERTIFICATE OF CORRECTION

PATENT NO.    : 6,470,512 B1
DATED         : October 29, 2002
INVENTOR(S)   : Lau et al.

It is certified that error appears in the above-identified patent and that said Letters Patent is hereby corrected as shown below:

Title page,
Above Item [57], ABSTRACT,
Insert -- [74], *Attorney, Agent, or Firm* -- W.F. Fasse; W.G. Fasse --;

Column 6,
Line 25, after "which", replace "ate" by -- are --;
Line 48, after "90", delete -- r --;
Line 49, before "having", delete -- h --;
Line 50, after "footprint", insert -- of --.

Signed and Sealed this

Eleventh Day of February, 2003

JAMES E. ROGAN
*Director of the United States Patent and Trademark Office*